Aug. 2, 1966    A. R. ZUBIK    3,264,387
BALING OF BUTYL RUBBER
Filed Oct. 29, 1962    3 Sheets-Sheet 1
FIG. 1.
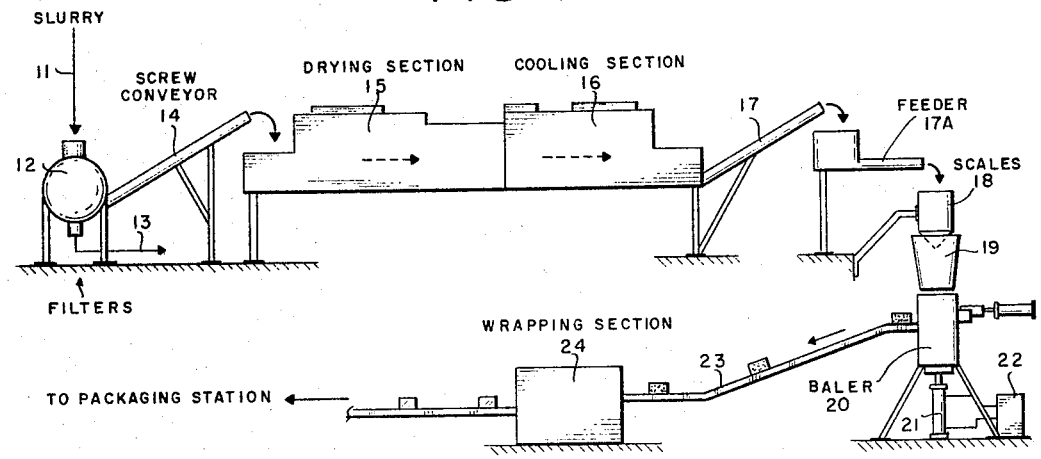
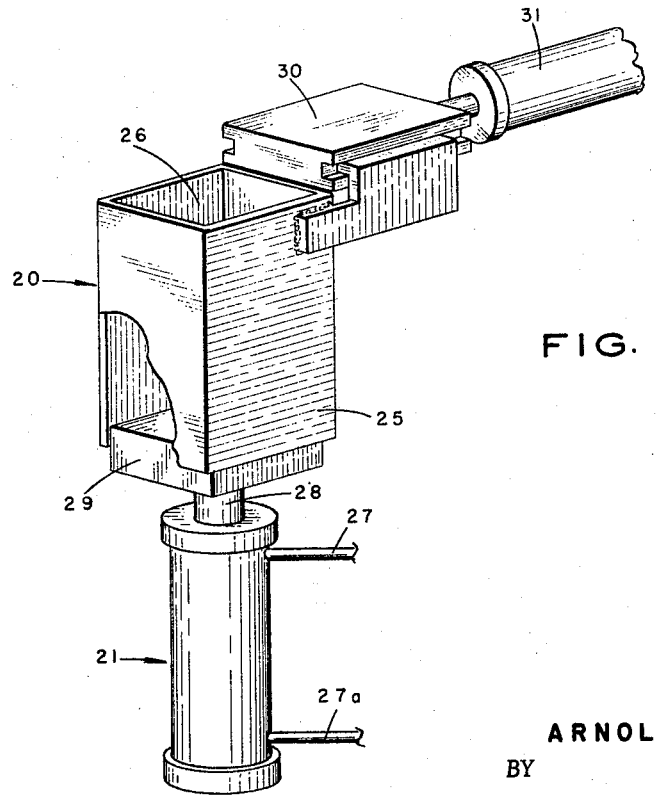
FIG. 2.
INVENTOR.
ARNOLD R. ZUBIK,
BY
ATTORNEY.

Aug. 2, 1966 A. R. ZUBIK 3,264,387
BALING OF BUTYL RUBBER
Filed Oct. 29, 1962 3 Sheets-Sheet 2

INVENTOR.
ARNOLD R. ZUBIK,
BY
ATTORNEY.

Aug. 2, 1966   A. R. ZUBIK   3,264,387
BALING OF BUTYL RUBBER
Filed Oct. 29, 1962   3 Sheets-Sheet 3

INVENTOR.
ARNOLD R. ZUBIK,
BY
ATTORNEY.

United States Patent Office 3,264,387
Patented August 2, 1966

3,264,387
BALING OF BUTYL RUBBER
Arnold R. Zubik, Baytown, Tex., assignor, by mesne assignments, to Esso Research and Engineering Company, Elizabeth, N.J., a corporation of Delaware
Filed Oct. 29, 1962, Ser. No. 233,598
6 Claims. (Cl. 264—123)

The present invention is directed to the baling of butyl rubber. More particularly, the invention is concerned with the baling of butyl rubber under conditions where a bale is formed which is not subject to distortion. In its more specific aspects, the invention is concerned with the high temperature, high pressure, short contact time baling of butyl rubber.

The present invention may be briefly described as a method for baling butyl rubber in which a confined body of butyl rubber is subjected to mechanical pressure of at least about 800 p.s.i. at a temperature no less than 140° F. for a time at least about 5 seconds to form a butyl rubber mass having a density at least twice as great as that of the confined body.

The present invention also involves a bale of butyl rubber having a density from about 40 to about 54 pounds per cubic foot and having the characteristic of retaining its shape for a sufficient length of time for packaging same without distortion. The bale has a peripheral bead or flange at least on one of its upper and lower ends which may be from about $\frac{1}{16}$-inch thick to about $\frac{1}{2}$-$\frac{5}{8}$-inch wide. This bead or rib shrinks on releasing the bale and tends to hold the bale in shape.

The butyl rubber which is baled in accordance with the present invention is manufactured by techniques well known in the art. Briefly, butyl rubber is a copolymer of a diolefin and a tertiary mono-olefin. For example, isoprene or butadiene and isobutylene are reacted at a temperature in the range from about −40° F. to about −160° F. in the presence of a Friedel-Crafts catalyst such as aluminum chloride. The catalyst system is ordinarily aluminum chloride in methyl chloride and the mixture of isoprene and isobutylene, for example, contacts the catalytic solution in a tubular type of reactor at the low temperature conditions to form a slurry of butyl rubber particles in solution in a diluent which may also be methyl chloride. The slurry is then introduced into water to form a slurry of butyl rubber, generally in the form of crumbs, in the water. The water is then removed from the slurry and the crumbs or particles of butyl rubber are recovered in accordance with the present invention. A description of a method for producing butyl rubber may be found in U.S. Patent No. 2,474,592.

In the practice of the present invention, particles or crumbs of butyl rubber having particle sizes ranging from about $\frac{1}{16}$ inch to about 2 x 6 x 10 inches may be used. While particle size is not generally critical, particles of substantially uniform size within this range may be employed. However, it is contemplated that crumbs or particles of butyl rubber of nonuniform size may also be processed in accordance with the present invention. The butyl rubber may be in the form of crumbs, particles, pellets, slivers, or any shape and may be baled in accordance with this invention.

Also in the practice of the present invention, particles of mechanically worked butyl rubber which have been worked, such as by extruding, milling, mixing, and cutting, or any combination of these, ranging in size from about $\frac{1}{8}$ inch to 4 inches in diameter may be used, with a range from about $\frac{1}{4}$ inch to about $1\frac{1}{2}$ inches being preferred. Particle size distribution in case of worked butyl is in general more critical and should be of substantially uniform size.

The operation is conducted by application of mechanical pressure to a confined body of the butyl rubber. Pressures may range from about 800 to about 3500 p.s.i., with a preferred range of pressures from about 1000 to about 1600 p.s.i.

Temperatures may range from about 140° F. to about 250° F. with a preferred temperature range from about 160° F. to about 180° F.

The time for applying the high pressure and temperature is within the range from about 5 to about 60 seconds, with a preferred time of about 5 to about 20 seconds.

Application of these conditions to a confined body of butyl rubber results in a bale having a density at least twice as great as that of the confined body or the butyl particles. Thus, the confined body may have a density of about 18 to about 25 pounds for butyl crumbs, usually about 20 pounds, and 25 to 35 pounds for worked butyl particles, usually about 30 pounds; whereas, the bale may have a density ranging from about 40 to about 54 pounds per cubic foot.

Typical characteristics of the butyl rubber baled in accordance with the present invention are shown in Table I.

Table I

| Property: | | Remarks |
|---|---|---|
| Mooney viscosity | -- | 22–100 (3′ at 260° F.). |
| Moisture | -- | 0.001–5% (wet basis). |
| Density | -- | 40–54 lbs./c.f. |
| Bale shape | -- | Consistent and uniform. |
| Temperature | -- | 140–250° F. |
| Crumb butyl particle size | -- | $\frac{1}{16}$ diameter to 2″ x 6″ x 10″. |
| Worked butyl particles | -- | Substantially uniform size up to about 4″ in diameter. |

The present invention will be further illustrated by reference to the drawing in which:

FIG. 1 is a flow diagram of a preferred mode for conducting the invention;

FIG. 2 is an isometric view of the baler of FIG. 1;

Figure 3:
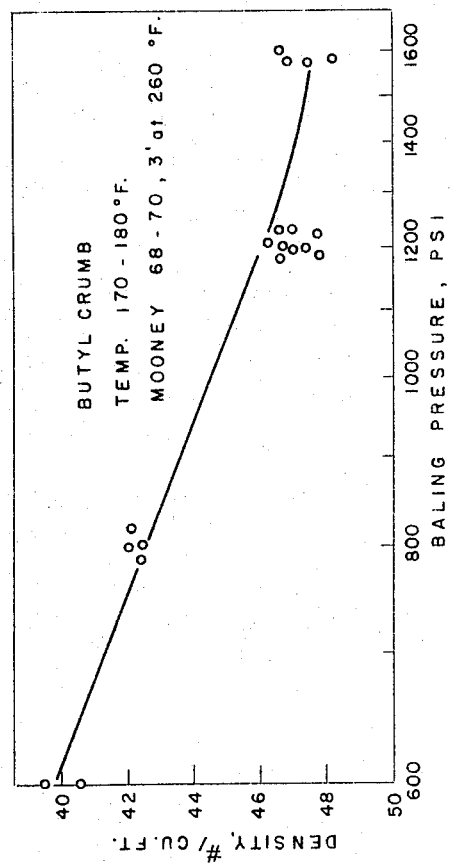
FIG. 3 is a plot of data relating density to the pressure employed for butyl crumbs of a particular type.

Referring now to the drawing and particularly to FIG. 1, numeral 11 designates a discharge line from the slurry tanks of a butyl rubber operation by way of which the aqueous slurry of butyl rubber is introduced into filtering means such as Oliver type filters 12. In the filter 12, the aqueous fluid is substantially removed and discharged by line 13, while the filtered butyl rubber particles or crumbs are introduced into a screw conveyor 14 whereby the filtered crumbs are introduced into a drying system such as a drying train 15 provided with suitable heating facilities to raise the temperature of the crumbs to a temperature in the range from about 100° F. to about 300° F. sufficient to remove substantially all of the water from the crumbs or butyl rubber particles. For example, the crumbs or particles in conveyor 14 may have a water content ranging from about 20 to about 30 percent by weight; whereas, in the drying train 15 the water content is reduced to about 0.001 to about 5.0 percent by weight. A portion of the drying train 15 is suitably provided with means for cooling the heated crumbs, or suitably a section such as 16 of the drying train 15 may omit the heating facilities such that the temperature of the dried butyl rubber particles or crumbs may be controlled. From the section 16 of the drying train 15, the dried particles or butyl rubber crumbs are discharged at a temperature within the range from about 160 to about 180° F. and introduced by a screw conveyor 17 via a feeder 17A onto scales 18 where the crumbs are suitably weighed prior to discharging by hopper means 19 into a baler 20, which is described in more detail with respect to FIG. 2. The baler 20 is provided with a hydraulic mechanism, including a piston and cylinder 21, operated by a suitable source of hydraulic fluid 22. The bales of butyl rubber are discharged from the baler 20 onto a conveyor 23 from whence the bales are discharged to a wrapping station 24 where the bales are suitably wrapped in a film of polyethylene prior to placement in boxes for shipment.

Referring now to FIG. 2, the baler, generally indicated by numeral 20, is comprised of a rectangular shape 25 defining a cavity 26 into which the particles of butyl rubber are discharged from the hopper means 19. The piston and cylinder arrangement 21 is provided with hydraulic fluid lines 27 and 27a for introduction and withdrawal of hydraulic fluid. The hydraulic mechanism 21 carries a ram 28 which actuates a block 29 having a size and shape such that it is movable vertically within the cavity 26. The upper end of the baler 20 is closed by a suitable block 30 which is movable laterally by a moving mechanism 31 which also may be hydraulically operated. As the butyl rubber particles are introduced into the top of the cavity 26, the block 30 is moved laterally to close the top of the cavity, and then pressure is exerted by the hydraulic mechanism to raise the block 29 into the cavity 26 to apply mechanical pressure thereto to form the bales under the temperature and pressure conditions and time of contact or dwell time given before. Under these conditions, a bale having the density within the range given is formed. The block 30 is withdrawn laterally and the block 29 is raised to discharge the bale out of the upper end. The block 30 then is again moved laterally to shove the bale onto the conveyor 23.

In order to illustrate the practice of the present invention further, a number of bales of varying density were formed by application of pressures ranging from about 800 to about 1600 p.s.i. These data are plotted in FIG. 3 wherein the relationship between high pressure and density is apparent.

Figure 4:
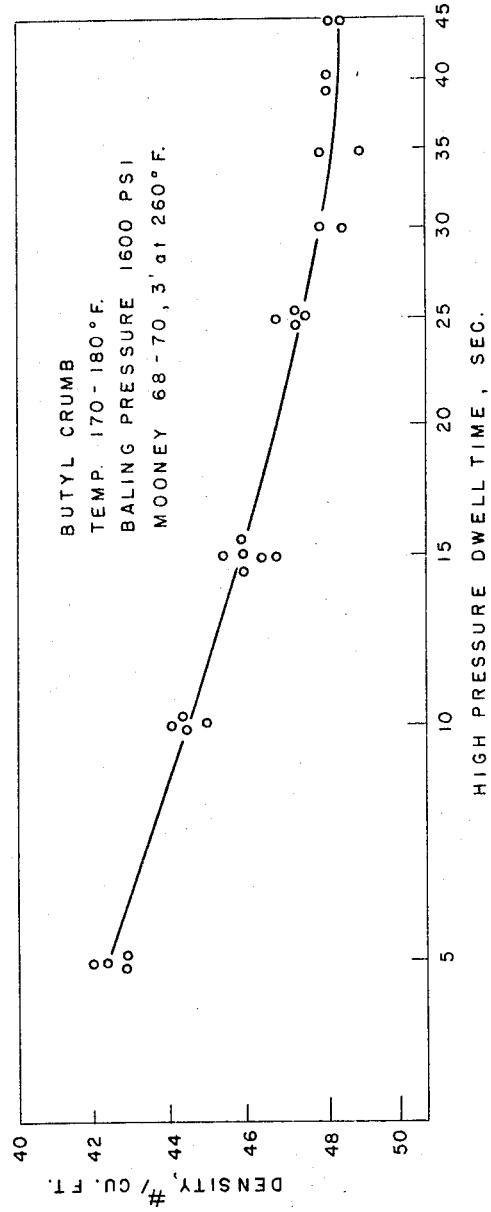
FIG. 4 is a similar plot of data for another type of butyl crumb showing the relationship between density and time of application of pressure.

In FIG. 4 the relationship between density and dwell time is plotted for butyl crumbs. It will be seen from these data that the density increases with the dwell time under the conditions given.

In both FIGS. 3 and 4 the characteristics of the butyl rubber and the conditions are presented.

Figure 5:
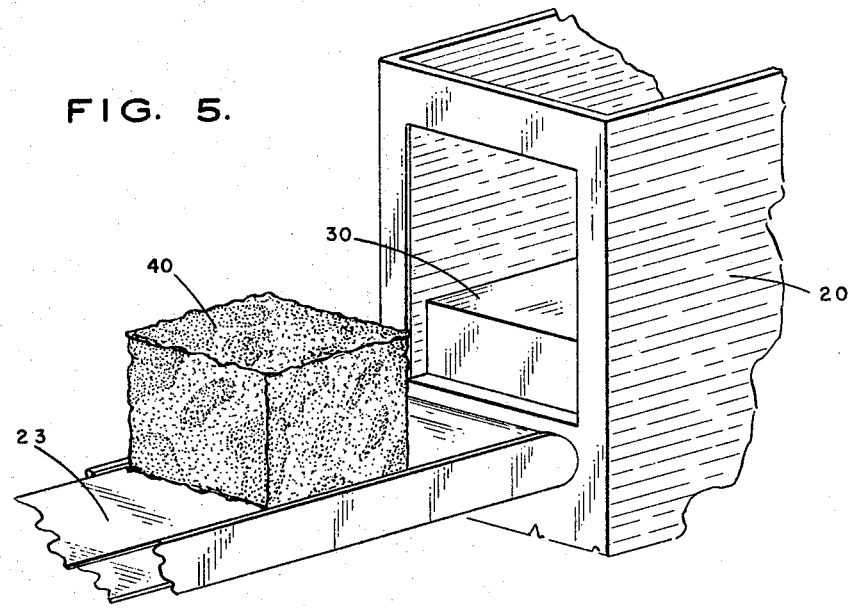
FIG. 5 is a showing of a bale of butyl rubber being discharged from the baler onto a conveyer.

Referring now to FIG. 5, it will be clear that the bale of butyl rubber 40 is composed of butyl crumb particles of nonuniform size as will be evident from the darkened areas of the bale 40. In this view, the bale 40 is being discharged from the baler 20 onto the conveyor 23.

Figure 6:
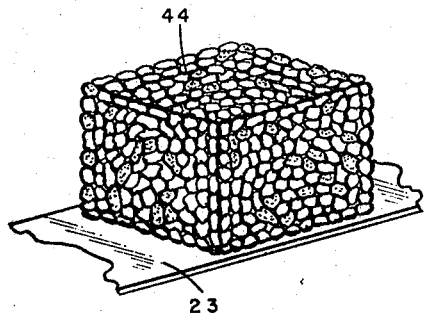
FIG. 6 is a view of a bale of butyl rubber made up of large particle sizes.

Referring now to FIG. 6, a bale 44 is shown on the conveyor 23, and it will be clear that the bale 44 is made up of particles of worked butyl rubber substantially uniform in size but of a size ranging from about ½ inch to about 2 inches.

Figure 7:
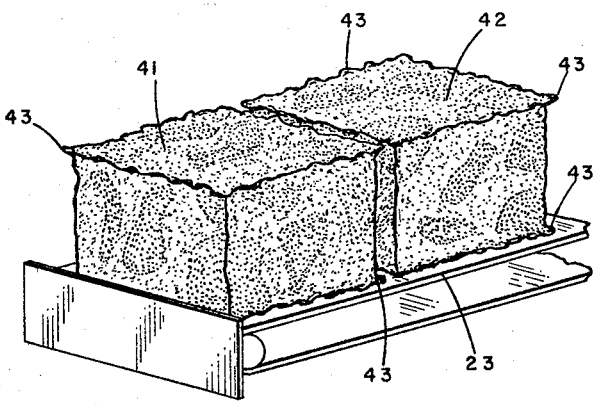
FIG. 7 shows two bales of butyl rubber at the end of the conveyor system.

In FIG. 7 it will be noted that two bales, such as 41 and 42, are on the conveyor 23, and these bales are also made up of particles of nonuniform size as indicated by the darkened areas. Of particular interest in FIG. 7 are the beads or peripheral flanges 43 on both ends of the bales 41 and 42. The beads are formed by the openings between the block 29 and cavity 26, and cover block 30 and cavity 26. These openings are necessary to allow air to escape from the cavity and to provide clearance between the movable parts. These peripheral flanges or beads serve to maintain the bales of a substantially uniform size.

In the practice of the present invention, the bale undergoes substantially no distortion after a time of about 2 to about 4 minutes. Ordinarily, the bale shrinks laterally and grows vertically at once upon release of pressure. A small amount of vertical and lateral growth occurs after ejection from the baler, but this growth may reach a peak within the time of about 2 to 4 minutes, after which no further growth occurs and the bale is wrapped in a film and packaged.

In the practice of the present invention, it is important that when baling butyl rubber crumbs or particles of nonuniform size the baling be done prior to substantial mechanical working. For example, nonuniform butyl rubber particles should be baled prior to any substantial extrusion or milling operations being conducted on the butyl rubber. If the butyl rubber is subjected to extrusion and/or milling prior to baling, the bale is distorted in shape and is of nonuniform size, particularly with large and nonuniform particles; whereas, in the practice of the present invention large and/or nonuniform particles may be baled successfully provided this is done prior to any subsequent extrusion and/or milling.

In the practice of this invention, should the dewatering and drying (the process described prior to screw conveyor 17 above) be accomplished by extrusion, milling mixing, or other mechanical working, the butyl rubber particles must be of substantially uniform size and not exceed about 4 inches in diameter.

The present invention is quite important and useful in that it provides an economical method for handling and packaging butyl rubber. Of great importance is the fact that the quality of the butyl rubber is maintained. The invention, therefore, is of considerable utility and has been applied commercially successfully.

Prior to the practice of the present invention, efforts had been made for a long time to bale butyl rubber successfully, and it was only with the discovery of the particular conditions that butyl rubber was satisfactorily baled.

The nature and objects of the present invention, having been completely described and illustrated and the best mode thereof set forth, what I wish to claim as new and useful and secure by Letters Patent is:

1. A method for baling butyl rubber which comprises subjecting a confined body of particles of butyl rubber having a particle size within the range from about 1/16 to about 2×6×10 inches and having a density within the range from about 18 to about 25 pounds per cubic foot to mechanical pressure within the range from about 800 to about 3500 p.s.i. at a temperature within the range from about 140° F. to about 250° F. for a time within the range from about 5 to about 60 seconds to form a butyl rubber mass having a density from about 40 to about 54 pounds per cubic foot and which maintains its shape and is free of substantial distortion.

2. A method in accordance with claim 1 in which the particles are in the form of crumbs.

3. A method in accordance with claim 1 in which the particles are of substantially uniform size.

4. A method in accordance with claim 1 in which the particles are of nonuniform size.

5. A method for baling mechanically worked butyl rubber which comprises subjecting a confined body of substantially uniform particles of butyl rubber having a particle size within the range from about ¼ to about 4 inches in diameter and having a density within the range from 25 to 35 pounds per cubic foot to mechanical pressure within the range from about 800 to about 3500 p.s.i. at a temperature within the range from about 140° F. to about 250° F. for a time within the range from about 5 to about 60 seconds to form a butyl rubber mass having a density from about 40 to about 54 pounds per cubic foot and which maintains its shape and is free of substantial distortions.

6. A method in accordance with claim 5 in which the worked butyl particles are substantially of the same size.

References Cited by the Examiner

UNITED STATES PATENTS

| | | | |
|---|---|---|---|
| 1,230,492 | 6/1917 | Kristufek | 100—35 |
| 1,822,939 | 9/1931 | Stout. | |
| 2,324,995 | 7/1943 | Allen et al. | 18—16 XR |
| 2,642,626 | 6/1953 | Yurgen | 18—48 |
| 2,779,974 | 2/1957 | Billing et al. | 100—35 XR |
| 2,895,939 | 7/1959 | Stober et al. | |
| 3,023,513 | 3/1962 | Herte et al. | 18—48 XR |
| 3,098,695 | 7/1963 | Jurgeleit | 264—331 XR |

FOREIGN PATENTS 878,970   10/1961   Great Britain.

OTHER REFERENCES

India Rubber World, May 1961, page 67, 18–48 R.

ROBERT F. WHITE, *Primary Examiner.*

ALEXANDER H. BRODMERKEL, *Examiner.*

M. R. DOWLING, *Assistant Examiner.*